United States Patent
Nicol et al.

[11] Patent Number: 6,141,762
[45] Date of Patent: Oct. 31, 2000

[54] POWER REDUCTION IN A MULTIPROCESSOR DIGITAL SIGNAL PROCESSOR BASED ON PROCESSOR LOAD

[76] Inventors: Christopher J. Nicol, 61 Hubbard Ave., Red Bank, N.J. 07701; Kanwar Jit Singh, 23 Kerry Dr., Hazlet, N.J. 07730

[21] Appl. No.: 09/128,030

[22] Filed: Aug. 3, 1998

[51] Int. Cl.[7] .................................. G06F 1/32; G06F 9/44
[52] U.S. Cl. .................... 713/300; 713/320; 713/501; 709/100
[58] Field of Search .................................. 713/300, 320, 713/321, 322, 323, 340, 501, 600; 709/100, 202; 327/291, 540; 365/227; 712/10

[56] References Cited

U.S. PATENT DOCUMENTS

| | | |
|---|---|---|
| 5,142,684 | 8/1992 | Perry et al. . |
| 5,727,193 | 3/1998 | Takeuchi . |
| 5,778,237 | 7/1998 | Yamamoto et al. . |
| 5,787,294 | 7/1998 | Evoy . |
| 5,812,860 | 9/1998 | Horden et al. . |
| 5,974,556 | 10/1999 | Jackson et al. . |

*Primary Examiner*—Gopal C. Ray
*Attorney, Agent, or Firm*—Henry T Brendzel

[57] ABSTRACT

Improved operation of multi-processor chips is achieved by dynamically controlling processing load of chips and controlling, significantly greater than on/off granularity, the operating voltages of those chips so as to minimize overall power consumption. A controller in a multi-processor chip allocates tasks to the individual processors to equalize processing load among the chips, then the controller lowers the clock frequency on the chip to as low a level as possible while assuring proper operation, and finally reduces the supply voltage. Further improvement is possible by controlling the supply voltage of individual processing elements within the multi-processor chip, as well as controlling the supply voltage of other elements in the system within which the multi-processor chip operates.

46 Claims, 2 Drawing Sheets

POWER REDUCTION IN A MULTIPROCESSOR DIGITAL SIGNAL PROCESSOR BASED ON PROCESSOR LOAD

BACKGROUND

This invention relates to electronic circuits and, more particularly to power consumption within electronic circuits.

Integrated circuits are designed to meet speed requirements under worst-case operating conditions. In Lucent Technology's 0.35 μm 3.3V CMOS technology, the "worst-case-slow" condition is specified for a temperature of 125C. and a chip supply voltage, $V_{dd}$, of 2.7V. The worst-case power consumption of the chip is quoted at the maximum supply voltage of 3.6V. The difference in chip performance at the "worst-case slow", nominal, and "worst-case-fast" conditions is shown in FIG. 1, where the frequency of a 25-stage ring oscillator is shown at different supply voltages and process corners. At the nominal operating voltage of 3.3V, the speed difference between "worst case slow" (WCS) and "worst case fast" (WCF) is a factor of 2.2. From the graph it can be seen that if a chip is designed to operate at 140 MHz and at 2.1V supply even when it is "worst-case-slow", a manufactured chip whose characteristics happen to be nominal will continue to operate at 140 MHz even when the chip supply is reduced to 2.1V.

The power consumption of a CMOS circuit increases linearly with operating frequency and quadratically with supply voltage. Therefore, a reduction in supply voltage can significantly reduce power consumption. For example, by reducing the nominal operating voltage from 3.3V to 2.1 V, the nominal power consumption of a 140 MHz chip is reduced by 60% without altering the circuit. This, of course, presumes an ability to identify and measure a chip's variation from nominal characteristics, and an ability to modify the supply voltage based on this measurement.

To achieve variable power supply voltage scaling, a programmable dc—dc converter may be used. Probably, the most efficient approach in use today is the buck converter circuit. These are well known in the art.

Voltage scaling as a function of temperature has been incorporated into the Intel Pentium product family as a technique to achieve high performance at varying operating temperatures and process corners. It is described in U.S. Pat. No. 5,440,520. The approach uses an on-chip temperature sensor and associated processing circuitry which issues a code to the off-chip power supply to provide a particular supply voltage. The process variation information is hard-coded into each device as a final step of manufacturing. This approach has the disadvantage of costly testing of each chip to determine its variance from nominal processing. Several manufacturers make Pentium-compatible dc—dc converter circuits, which are highlighted in "Powering the Big Microprocessors", by B. Travis, EDN, Aug. 15, pp. 31–44, 1997.

Recently, there has been considerable interest in integrating much of the buck controller circuit onto the chip. The only off-chip components are the inductor (typically about 10 μH) and capacitor (typically about 30 μF) used in the buck converter. Efficiencies in excess of 80% are typical for a range of voltages and load currents. See, for example, "A High-Efficiency Variable Voltage CMOS Dynamic dc—dc Switching Regulator," by W. Namgoong, M. Yu, and T. Meng, Proceedings ISSCC97 pp. 380–381, February, 1997. Researchers have been also experimenting with on-chip voltage scaling techniques to counter process and temperature variations. See "Variable Supply-Voltage Scheme for Low Power High-Speed COMS Digital Design," by T. Kuroda et al, CICC97 Conference Proceedings, and JSSC Issue of CISS97, May, 1998. The Kuroda et al paper demonstrates that the speed of the circuit can be maintained (or at least the speed degradation can be minimized) by tuning the threshold voltages even as the supply voltage is lowered. The tuning is achieved on-chip by varying the substrate-bias voltage. These techniques are needed to ensure that the leakage current, which increasing as the threshold voltage is reduced, does not become too large.

Thus, it is known that varying supply voltage to a chip can improve performance by eliminating unexpected variability in the supply voltage, and by accounting for process and operating temperature variations.

SUMMARY OF THE INVENTION

Improved performance of multi-processor chips is achieved by dynamically controlling the processing load of chips and controlling, which significantly greater than on/off granularity, the operating voltages of those chips so as to minimize overall power consumption. A controller in a multi-processor chip allocates tasks to the individual processors to equalize processing load among the chips, then the controller lowers the clock frequency on the chip to as low a level as possible while assuring proper operation, and finally reduces the supply voltage. Further improvement is possible by controlling the supply voltage of individual processing elements within the multi-processor chip, as well as controlling the supply voltage of other elements in the system within which the multi-processor chip operates.

DETAILED DESCRIPTION

Figure 2:
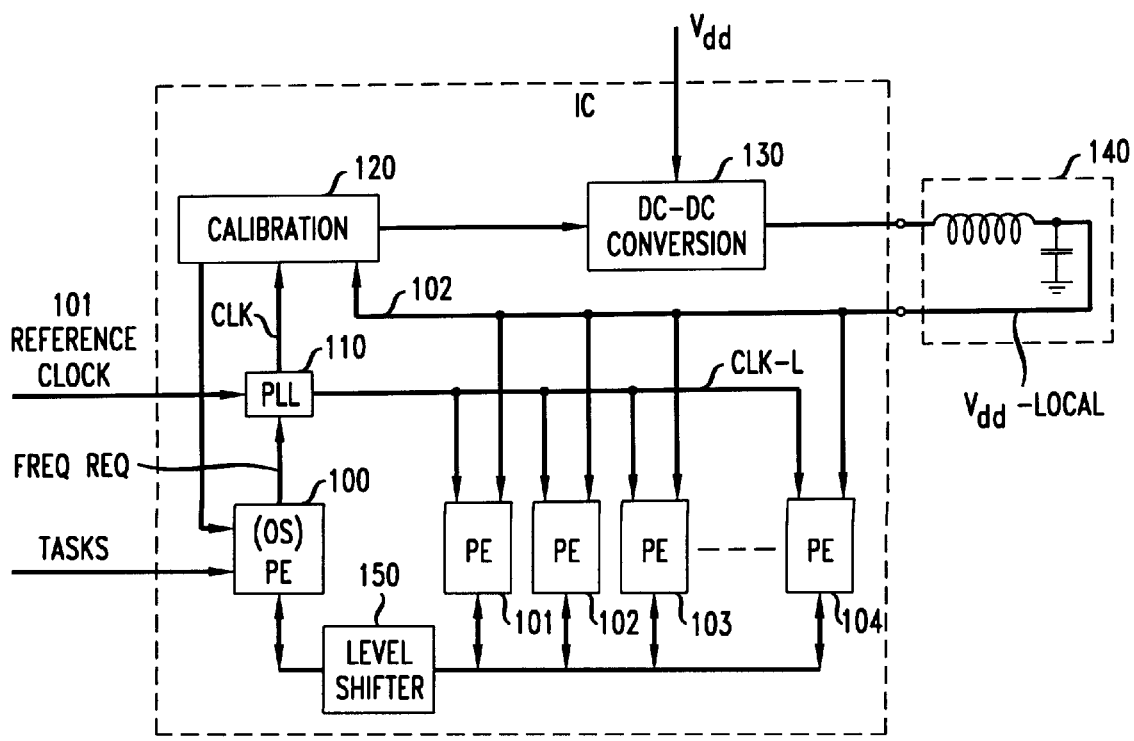
FIG. 2 presents a block diagram of a multi-processor chip with supply voltage control in accordance with the principles disclosed herein.

FIG. 2 depicts a block diagram of a multi-processor chip. It contains processing elements (PEs) 100, 101, 102, 103, . . . 104, and each PE contains a central processing unit (CPU) and a local cache memory (not shown). A real-time operating system resides in PE 100 and allocates tasks to the other PEs from a mix of many digital signal processing applications. The load of the FIG. 2 system is time varying and is dependent on the applications that are being executed at any given time. For example, a set-top-box for a multimedia broadband access system might need to receive an HDTV signal. It could also be transmitting data from a computer, to the Internet, and responding to button requests from a remote control handset. Over time, this dynamic mix of applications places different load requirements on the system.

For a maximally utilized system, all of the available processors ought to be operating at full speed when satisfying the maximum load encountered by the system. At such a time, the power consumption of the multiprocessor chip is at its maximum level. However, as the load requirements are lowered, the system should, advantageously, reduce its power consumption. It may be noted that, typically, computers spend 99% of their time waiting for a user to press a key. This presents a great opportunity to drastically reduce the average power consumption. The specific approach by which the system "scales back" its performance can greatly impact the realizable power savings.

In the FIG. 2 arrangement, in accordance with the principles disclosed herein, the applications that need to be processed are mapped to the N PEs under control of real time operating system (RTOS) executed on PE 100. If the number of instructions that need to be executed for each task is known and made available to the operating system, a scheduler within the operating system can use this information to determine the best way to allocate the tasks to the available processors in order to balance the computation. The intermediate goal, of course, is to maximize the parallelism and to evenly distribute the load presented to the FIG. 2 system among all of the PE's.

Figure 1:
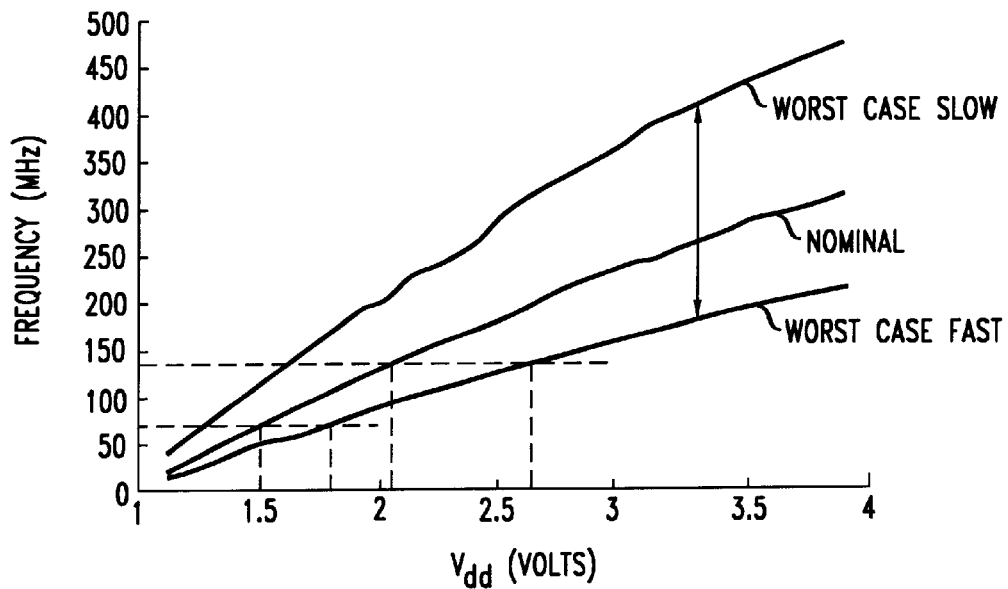
FIG. 1 illustrates the maximum operating frequency that is achievable with a 0.35 μm technology CMOS chip as a function of supply voltage.

When an application that is running on the FIG. 2 system is subdivided into N concurrent task streams, as suggested above, each of the PEs become lightly loaded. This allows the clock frequency of the PEs to be reduced, and if the task division can be carried out perfectly, then the clock frequency of the FIG. 2 system can be reduced by a factor of N. Reducing the frequency, as indicated above, allows reducing the necessary supply voltage, and reducing the supply voltage reduces the system's power consumption (quadratically). To illustrate, if a given application that is executed on 1 PE requires operating the PE at 140 MHz, it is known from FIG. 1 that the PE can be operated at approximately a 2.7V supply. When the application is divided into two concurrent tasks and assigned to two PEs that are designed to operate at 140 MHz from a 2.7V supply, then the PEs can be operated at 70 MHz and at a supply voltage of 1.8V. This reduction in operating voltage represents a power saving of 55%. Of course, it is unlikely that an application can be perfectly divided into two equal load task streams and, therefore, the 55% power saving is the maximum achievable power saving for two PEs.

It should be understood that in the above example, when two PEs are employed and their operating frequency can be reduced to 70 MHz, the indicated reduction presumes that it is desired to perform the given tasks as if there was a single PE that operates at 140 MHz. That is, the presumption is that there is a certain time when the tasks assigned to the chip must be finished. In fact, there might not be any particular requirement for when the tasks are to be finished. Alternatively, a requirement for when the tasks are to be finished might not be related to the highest operating frequency of the chip.

For example, the above-illustrated chip (where each of the PEs is designed to operate at 140 MHz) might be employed in a system whose basic frequency is related to 160 MHz. In such an arrangement, dividing tasks between the two PEs of the chip and operating each of the PEs at 80 MHz would be preferable because it would be easier to synchronize the chip's input and output functions to the other elements in the system. Thus, in a sense it is the expected completion time for the collection of assigned tasks that is controlling, and the reduction of frequency from the maximum that the chip can support may be controlled by the division of tasks that may be accomplished.

Hence, the operating system of PE 100 needs to ascertain the required completion time, divide the collection of tasks as evenly as possible (in terms of needed processing time), consider the PE with the tasks that require the most time to carry out, and adjust the clock frequency to insure that the most heavily loaded PE carries out its assigned tasks within the required completion time. Once the frequency is thus determined, a minimum supply voltage can be determined. The supply voltage determination can be made by reference to a plot like the one shown in FIG. 1 or, advantageously, by evaluating the actual performance of the multiprocessor at hand.

As indicated above, the operating system can reduce the supply voltage even further by tracking temperature and process variations. For example, when the chip is nominal in its characteristics, then it can be operated along line 20 of FIG. 1, which calls for only 1.5V supply when operating at 70 MHz.

Returning the discussion to FIG. 2, the programmable-frequency clock is generated using an appropriately multiplied input reference clock (line 101) via a phase lock loop frequency synthesizer circuit 110 which has a high resolution, e.g., can be altered in increments of 5 MHz. Advantageously, two clocks are generated by PLL 110 (requiring two synthesizer circuits), a Clk clock, and a Clk-L which is 1 frequency step lower than Clk when Clk is being increased. For example, in a PLL 110 unit that provides 5 MHz resolution, when Clk is being increased from 75 MHz to 80 MHz, the value of Clk-L is set to 75 MHz.

Clk-L is applied to the PEs, while Clk is applied to calibration circuit 120, which generates a supply voltage command. The supply voltage command is applied to dc—dc converter 130 followed by L-C circuit 140 to cause the combination of converter 130 and L-C circuit 140 to create the supply voltage $V_{dd}$-local, which is fed back to calibration circuit 120 via line 102. The $V_{dd}$-local supply voltage is also applied to all of the PEs (excluding perhaps the operating system PE 100).

The reason for having the frequency Clk-L lag behind the frequency Clk is that the clock frequency applied to the PEs should not be increased prior to the supply voltage being increased to accommodate the higher frequency. Otherwise, the PEs might fail to perform properly. Circuit 120 observes the level on line 102 to determine whether it corresponds to the voltage necessary to make PEs 100–104 operate properly (described below), and it also waits till the signal on line 102 is stable (following whatever ringing occurs at the output of L-C circuit 140. The signal on line 121 provides information to PE 100 (yes/no) to inform the operating system of when the supply voltage is stable. When the voltage is stable and Clk has reached the required frequency, the operating system sets Clk-L to Clk and then changes the task allocation on the PEs to correspond to that which the PEs were set up to accommodate.

Figure 3:
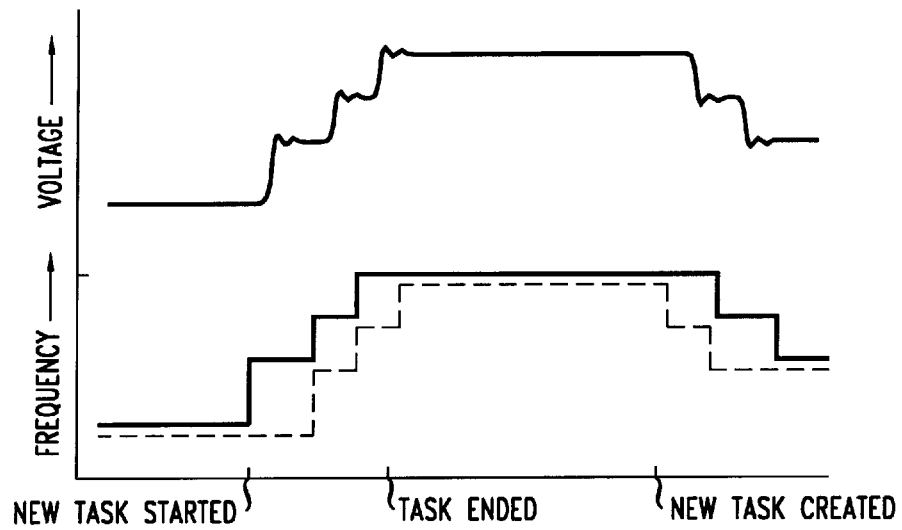
FIG. 3 shows the relationship between the voltage control clock, Clk, of FIG. 2, the clock applied to the processing elements of FIG. 2, Clk-L, and the supply voltage applied to the processing elements, $V_{dd}$-local.

FIG. 3 demonstrates the timing associated with increasing Clk, Clk-L and $V_{dd}$-local when a new task is created and the load on the multiprocessor is thus increased, and the timing associated with decreasing Clk, Clk-L and $V_{dd}$-local when the load on the multiprocessor is decreased. Specifically, it shows the system operating at 70 MHz from a 1.8V supply when the load is increased in three steps to 140 MHz. When the 2.7V supply is stable, as shown by the supply voltage plot, the new task is enabled for execution. Some time thereafter according to FIG. 3, a task completes, which reduces the load on the multiprocessor. The reduced load permits lowering the clock frequency to 100 MHz and lowering the supply voltage to 2.1V. This, too, is accommodated in steps (two steps, this time), with Clk-L preceding Clk to insure, again, that the PEs continue to operate properly while the supply voltage is decreased.

Calibration block 120 can use one of several techniques to determine the voltage required to operate the circuit at a given clock frequency. One technique is given in Koruda et al article. Recognizing that each of the PEs (101–104) has a critical path which controls the ultimate speed of the PE, block 120 uses two copies of that portion of the PE circuit that contains the critical path of the PE circuit, with one of the copies being purposely designed to be just slightly slower. Both of the copies are operated from clock signal Clk and from the $V_{dd}$-local supply voltage of line 102, and that voltage is adjusted within block 120 so that, while operating at frequency Clk, the slightly slower PE fails to operate properly while the other PE does operate properly. This guarantees that the PE's are operating from a supply voltage that is "just above" the point at which they are likely to fail. Since the two critical path copies within element 120 experience the same variations in temperature as do PEs 101–104, the $V_{dd}$-local supply voltage appropriately tracks the temperature variations as well as the different operating frequency specifications.

The FIG. 2 system uses the operating system to react to variations in the system load. As more tasks are entered into the "to-do" list, the operating system of PE 100 computes the correct way to balance the additional computational requirements and allocates the tasks to the processors. It then computes the required operating frequency.

It is noted that the frequency is gradually programmed into the system (as shown by the stepped changes in FIG. 3). This prevents excessive noise on the $V_{dd}$-local supply voltage and possible circuit failure. For example, if the system is operating at 50 MHz and it needs to operate at 75 MHz, the clock frequency is increased slowly, perhaps even as slowly as in 5 MHz increments. In addition, as indicated above, the $V_{dd}$-local supply voltage is increased ahead of increasing the frequency of the clock the operates the PEs, when increased processing capability is desired, and the clock is reduced ahead of reducing the supply voltage when reduced processing capability will suffice.

Of course, $V_{dd}$-local can only be reduced so-far before the circuits start to fail, at which point the operating system employs gated clocking techniques to "shut down" PEs that are not needed. Of course, the fact that supply voltage $V_{dd}$-local varies as a function of load should be accounted for in the interface between the PEs 101–104 and PE 100 (as well as in the interface between the multiprocessor chip and the "outside world". This is accomplished with level converter 150, which is quite conventional. It basically converts between the voltage level of PEs 101–104 and the voltage level of PE 100.

The notion of adjusting operating frequency to load and adjusting supply voltage to track the operating frequency can be extended to allow each PE to have its own supply voltage. The benefit of this approach for some applications becomes apparent when it is realized that the chip-wise voltage scaling is most effective when the load of the computation can be evenly distributed across all of the PEs. In some applications, however, one may encounter tasks that cannot be partitioned into concurrent evenly-loaded threads and, therefore, some PE within the multiprocessor would require a higher operating frequency and a higher operating voltage. This would require raising the frequency and voltage of the entire multiprocessor chip.

Figure 4:
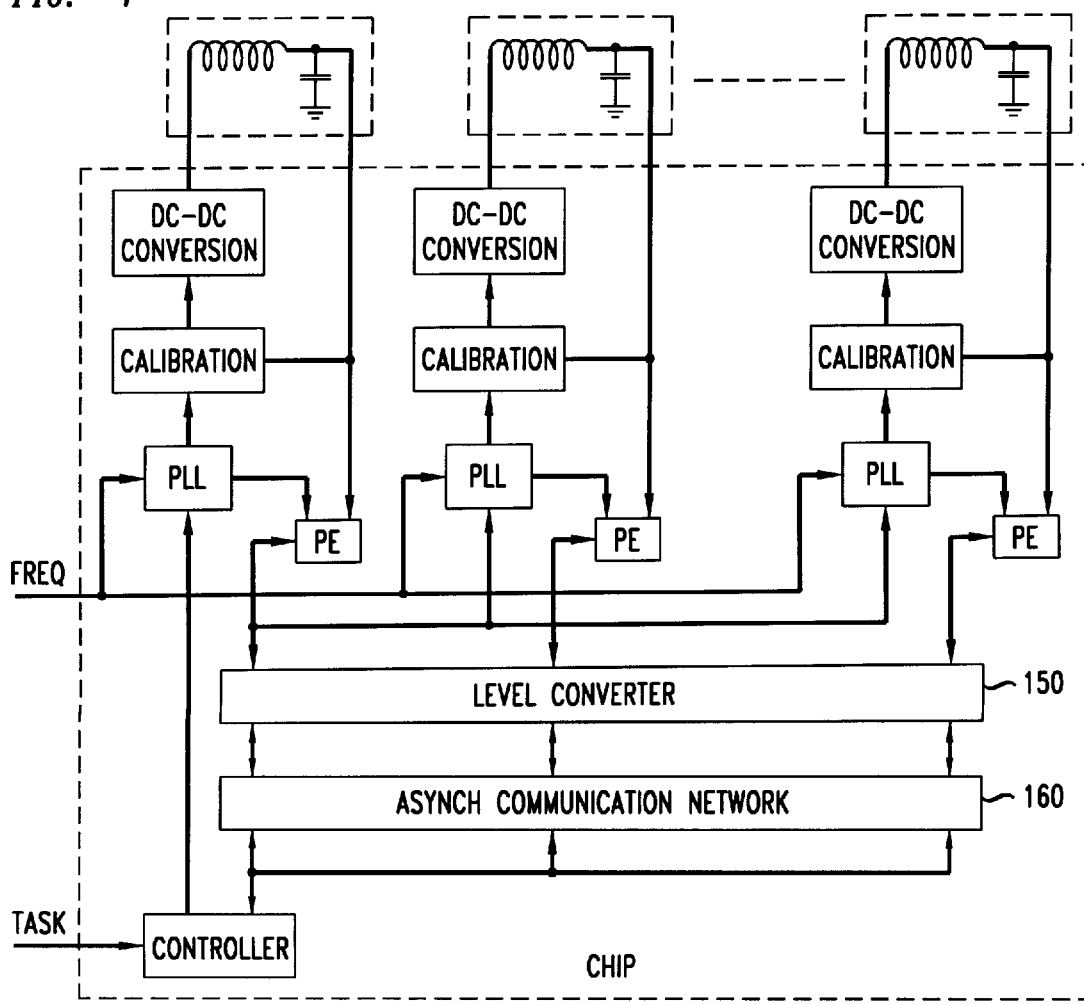
FIG. 4 depicts the block diagram of a multi-processor chip with supply voltage control that is individual to each of the processing elements.

A separate power supply for each PE in a chip overcomes this limitation by allowing the operating system to independently program the lowest operating frequency and corresponding lowest supply voltage for each PE. The architecture of such an arrangement is shown in FIG. 4. Each PE in FIG. 4 needs an independent controller that performs the functions of PE 100 (except it does not divide tasks among PEs). As shown in FIG. 4, all of the controllers are embodied in a single controller 200, which may be just another processing element of the integrated circuit that contains the other processing elements. Each processing element also requires a calibration circuit like circuit 120, and a voltage converter circuit like circuits 130 and 140. It also has a PE 200 that assigns the tasks given to the multi-processor chip of FIG. 4 among the PEs.

It may be noted that if the frequencies at which the individual PEs operate differ from one another and from other elements within the system where the multiprocessor chip is employed, there is an issue of synchronization that must be addressed. That is, a synchronization schema must be implemented when there is a need to communicate data between PEs (or with other system elements) that operate at different frequencies. It is possible to arrange the frequencies so that the collection of tasks that are assigned to the multiprocessor is completed at a predetermined time. In such a case, the synchronization problem of the multiprocessor vis-a-vis other elements within the system where the multiprocessor is employed is minimized. However, that leaves the issue of synchronizing the exchange of data among the PEs of a multiprocessor chip.

To effect such synchronization, each PE within the FIG. 4 arrangement is connection to an arrangement comprising elements 150 and 160. Level converter 150 converts the variable voltage swings of the PEs to a fixed level swing, and network 160 resolves the issue of different clock domains.

The principles disclosed above for a multiprocessor is extendible to other system arrangements. This includes systems with a plurality of separate processor elements that operate at different frequencies and operating voltages, as well as components that are not typically thought of as processor elements. For example, there is a current often-used practice to maintain program code and data for different applications of a personal computer in a fast memory. As each new application is called, more information is stored in the fast memory, until that memory is filled. Thereafter, when a new application is called, some of the information in the fast memory is discarded, some other information is placed in the slower hard drive, and the released memory is populated with the new application. It is possible to anticipate that memory stored in the fast memory is so old as to be unlikely to be accessed before a new application is called. When so anticipated, some of the fast memory can be released (storing some of the data that needed to be remembered) at a leisurely pace. That is, lower clock frequency can be employed in connection with the fast memory and the hard drive, with a corresponding lower supply voltage, resulting in an overall power saving in both the memory's operation and in the operation of the hard drive.

The above description illustrated the principles of this invention, but it should be realized that a skilled artisan may easily make various modifications and improvements that are within the scope of this invention as defined by the appended claims. For example, in one of the embodiment disclosed above all of the PEs in a multi-processor chip are subjected to a single controlled supply voltage. In another embodiment disclosed above each of the PEs in a multi-processor chip is subjected to its own, individually controlled, supply voltage. It should be realized, however, that a middle ground is also possible; i.e., the PEs of a multi-processor chip can be divided into groups, and each group of PEs can be arranged to operate from its own controlled supply voltage. To cite another example, the FIG. 2 embodiment employs two almost identical critical path circuits to establish the minimum supply voltage. Alternatively, the voltage may be set in accordance with a preset frequency-voltage relationship that is not unlike the one depicted in FIG. 1.

It should also be noted that level converter 150 is interposed in FIG. 2 between PE 100 and the other PEs because PE 100 is operating off $V_{dd}$. PE 100 can also be operated off $V_{dd}$-local, in which case the level converter is interposed between PE 100 and the input/output port of the FIG. 2 circuits that interacts with PE 100.

It should further be noted that the power supply circuit need not have any elements outside the circuit itself (as depicted in FIG. 2). A skilled artisan would be aware that circuit design exists that can be manufactured wholly within an integrated circuit.

Yet another modification may be implemented by discarding the two-step application of voltages and frequencies of FIG. 3 when appropriate timing conditions are met.

We claim:

1. A method executed within a system for controlling power consumption of a sub-circuit of said system comprising the steps of:
    ascertaining time allotted for carrying out an assigned task;
    determining a lowest frequency at which or above which the sub-circuit must operate in order to complete execution of the assigned task within the allotted time; and
    based on characteristics of the sub-circuit, setting a supply voltage that is applied to the sub-circuit to a lowest level that insures proper operation of the sub-circuit at the determined frequency.

2. The method of claim 1 further comprising the step of executing said task after said voltage is set, and a frequency at which or above which the sub-circuit is set to said determined frequency.

3. The method of claim 1, carried out in a multiprocessor sub-circuit, wherein said assigned task comprises a plurality of sub-tasks, the method further comprising the step of
    apportioning said sub-tasks among processors of said multiprocessor sub-circuit, resulting in one of said processors carrying the largest load of sub-tasks processing, compared to the sub-tasks processing load of others of said processors, where
        said step of apportioning is executed prior to said step of determining, and
        said step of determining ascertains the lowest frequency that, when employed at the processor carrying the largest load of sub-tasks processing, is sufficient to complete its assigned sub-tasks processing within the allotted time.

4. The method of claim 3 further comprising the step of assigning the subtasks to said processors in accordance with said apportioning.

5. The method of claim 1, wherein said steps are executed in a multiprocessor integrated circuit.

6. The method of claim 5 where said steps are executed in said processor under control of a real-time operating system.

7. The method of claim 6 wherein assigned task comprises a plurality of sub-tasks and said method further comprising a step, executed in said processor under control of said real-time operating system, of apportioning said sub-tasks among processors of said multiprocessor sub-circuit.

8. The method of claim 1 wherein said steps are executed in a circuit that comprises distinct, cooperating, processing units.

9. The method of claim 1 wherein the determined frequency assumes values that are multiples of a preset frequency increment.

10. The method of claim 1 wherein the step of setting a supply voltage is sensitive to an operational state of two circuits that are identical except that one is slower than the other.

11. The method of claim 10, carried out in an integrated circuit, wherein said two circuits are within said integrated circuit.

12. The method of claim 10 wherein the step of setting a supply voltage adjusts the supply voltage to cause the slower of the two circuits to be at a failed operational state, and the other of the two circuits to be at a working operational state.

13. The method of claim 2 further comprising the steps of:
    determining a new lowest frequency, when a new task is assigned, at which or above which the sub-circuit must operate in order to complete execution of the assigned task within the allotted time;
    comparing the lowest frequency to the new lowest frequency to determine whether a new operating frequency should be set for said sub-circuit;
    when said step of comparing determines that the new lowest frequency is lower than said lowest frequency, reducing the frequency at which said sub-circuit is set to operate and, thereafter, reducing the supply voltage that is applied to the sub-circuit; and
    when said step of comparing determines that the new lowest frequency must be higher than said lowest frequency, increasing the supply voltage that is applied to the sub-circuit and, thereafter, increasing the frequency at which said sub-circuit is set to operate to said new lowest frequency.

14. The method of claim 1 wherein the characteristics of the sub-circuit are expressed as a relationship between frequency and supply voltage.

15. The method of claim 1 further comprising the step of converting output levels of said sub-circuit to standardized levels.

16. The method of claim 1 further comprising the step of synchronizing output signals of said sub-circuit to a timing signal of said system.

17. A circuit that includes a processor, comprising:
    a controller, responsive to an applied task and to a specification of a time interval, where duration of at most said time interval is necessary for execution of said applied task, for developing a frequency of operation for said processor that is the lowest frequency of operation that allows completion of said applied task within said time interval;
    a calibration circuit responsive to said controller for directing creation of a supply voltage for said processor, and
    a power supply responsive to said calibration circuit, for developing said supply voltage for said processor and applying said supply voltage to said processor;
    wherein said controller directs said processor to execute said task after said supply voltage is applied to said processor and the frequency of a clock applied to said processor is set to said lowest frequency of operation that allows completion of said applied task within said time interval.

18. The apparatus of claim 17 wherein said processor, said calibration circuit and all amplifying elements of said power supply are on a single circuit board.

19. The apparatus of claim 17 wherein said processor, said calibration circuit and all amplifying elements of said power supply are manufactured within an integrated circuit.

20. The apparatus of claim 17 further comprising a level converter circuit interposed between input/output ports of said circuit and said processor, to convert voltages levels passing between said input/output ports and said processor.

21. The apparatus of claim 17 wherein said controller includes a generator of clock signals that develops a first clock signal having a first frequency and applied to said calibration circuits, and a second clock signal having a second frequency applied to said processor, wherein the second frequency is set to said first frequency or to a lower frequency.

22. The apparatus of claim 21 wherein said controller directs said calibration circuit to decrease said supply voltage when an applied task results in said controller developing a frequency of operation for said processor that is lower than an existing frequency of operation for said processor, and when said calibration circuit is directed to decrease said supply voltage, said controller sets the second frequency to a frequency that is lower than said first frequency prior to said supply voltage being decreased.

23. The apparatus of claim 21 wherein said controller directs said calibration circuit to increase said supply voltage when an applied task results in said controller developing a frequency of operation for said processor that is higher than an existing frequency of operation for said processor, and when said calibration circuit is directed to increase said supply voltage, said controller sets the second frequency to said first frequency only after said supply voltage is increased.

24. The apparatus of claim 17 wherein said controller directs said calibration circuit to decrease said supply voltage when an applied task results in said controller developing a frequency of operation for said processor that is lower than an existing frequency of operation for said processor, and when said calibration circuit is directed to decrease said supply voltage, said controller sets the second frequency to a frequency that is lower than said first frequency prior to said supply voltage being decreased.

25. The apparatus of claim 17 wherein said controller directs said calibration circuit to increase said supply voltage when an applied task results in said controller developing a frequency of operation for said processor that is higher than an existing frequency of operation for said processor, and when said calibration circuit is directed to increase said supply voltage, said controller sets the second frequency to said first frequency only after said supply voltage is increased.

26. The apparatus of claim 17 wherein said task includes a plurality of sub-tasks, said processor comprises a plurality of processing elements, said controller partitions said sub-tasks among said processing elements and develops said frequency of operation for said processor based on said partitioning.

27. The apparatus of claim 26 wherein said controller develops said frequency of operation for said processor by evaluating the lowest frequency of operation for a most-burdened processing element that would still complete execution within said time interval, wherein the most-burdened processing element is a processing element to which sub-tasks are allocated that require, in the aggregate, the most processing time.

28. The apparatus of claim 27 wherein said controller partitions said sub-tasks with the goal of partitioning the sub-tasks evenly, based on a processing burden criterion, among the processing elements.

29. The apparatus of claim 26 further comprising a level converter coupled to input/output ports of said processing elements.

30. The apparatus of claim 26 wherein said processing elements, said controller, said calibration circuit and all amplifying elements of said power supply are manufactured within an integrated circuit.

31. The apparatus of claim 17 wherein said calibration circuit includes two copies of at least a portion of said processor, wherein one copy is manufactured to operate at fast as said portion operates within said processor, and the other copy is manufactured to operate more slowly.

32. The apparatus of claim 17 wherein said processor comprises N processing elements, said controller comprises N controller sub-modules, said calibration circuit comprises N calibration circuit sub-modules, and said power supply comprises N power supply modules, and wherein
the i-th calibration circuit sub-module is responsive to the i-th controller sub-module and directs the i-th power supply module, the i-th power supply module provides power to the i-th processing element, and the i-th processing element is responsive to the i-th controller sub-module.

33. The apparatus of claim 32 wherein said processor, said calibration circuit and all amplifying elements of said power supply are manufactured within an integrated circuit.

34. The apparatus of claim 33 further comprising a processing element for accepting said task and, when said task comprises a plurality of sub-tasks, for partitioning said sub-tasks among the N processing elements.

35. The apparatus of claim 34 wherein said processing element for accepting said task, processor, said calibration circuit and all amplifying elements of said power supply are manufactured within an integrated circuit.

36. The apparatus of claim 32 further comprising means within said controller for turning supply power off to at least one of said N processing elements.

37. The apparatus of claim 32 further comprising a level converter associated with each of said processing elements and coupled to input/output ports of said associated processing elements.

38. The apparatus of claim 37 further comprising a synchronization circuit coupled to said level converters.

39. A circuit comprising:
a controller processing element;
a plurality of task-handling processing elements;
a calibration circuit responsive to said controller processing element for directing creation of a supply voltage for said processing elements; and
a power supply circuit, responsive to said calibration circuit, for developing a supply voltage for said task-handling processing elements;
wherein said controller processing element directs said task-handling processing elements to execute tasks at a selected processing frequency.

40. The circuit of claim 39 wherein said controller processing element, task-handling processing elements, and calibration circuit are on a single circuit board.

41. The circuit of claim 39 wherein said controller processing element, task-handling processing elements, and calibration circuit are within an integrated circuit.

42. The circuit of claim 39 further comprising a level converter interposed between said controller processing element and said task-handling processing elements.

43. A circuit that includes a processor, comprising:
first means, responsive to an applied task and to a specification for a time interval, where duration of at most said time interval is necessary to execute said task, for developing a frequency of operation for said processor that is the lowest frequency of operation that allows completion of said applied task within said time interval;

second means responsive to said first means for directing creation of a supply voltage for said processor, and third means, responsive to said second means, for developing said supply voltage for said processor and applying said supply voltage to said processor;

wherein said first means directs said processor to execute said task after said supply voltage is applied to said processor and the frequency of a clock applied to said processor is set to said lowest frequency of operation that allows completion of said applied task within said time interval.

44. A method for operating a processor comprising the step of applying a supply voltage to said processor as a function of frequency necessary to operate said processor to complete an assigned task within an assigned time interval.

45. The method of claim 44 wherein said function substantially minimizes power consumption in said processor.

46. The method of claim 44 wherein said frequency is set to a minimum level that still enables completing said task in an allotted time interval.

* * * * *